July 14, 1936.  H. H. M. VAN SWIJNDREGT ET AL  2,047,299
COOLING VESSEL FOR PRESERVING FOOD PRODUCTS AND THE LIKE
Filed Oct. 20, 1934

INVENTORS:
HUBERTUS HENDRIK MONTAUBAN VAN SWYNDREGT.
AND GERRIT JOHANNES DE BRUYN
PER: J. Severn
ATTORNEY.

Patented July 14, 1936

2,047,299

UNITED STATES PATENT OFFICE 2,047,299

COOLING VESSEL FOR PRESERVING FOOD PRODUCTS AND THE LIKE

Hubertus Hendrik Montauban van Swijndregt and Gerrit Johannes de Bruyn, The Hague, Netherlands Application October 20, 1934, Serial No. 749,232 In Belgium and France September 26, 1934

2 Claims. (Cl. 62—91)

The present invention relates to a vat, casing or vessel made of porous earthenware or the like, in which capillary penetration and natural evaporation of a fluid produces a decrease of temperature within the container.

Apparatus constructed according to the aforesaid principle are known and they are generally constituted by means of porous plates which are mounted within metal frames of large dimensions, whereas the lower ends of said frames are immersed in a water filled channel or trough. Such apparatus presents the drawback that only a portion of the useful wall surface remains free and that evaporation is only possible at such places, while furthermore the use of an open water trough or channel at the underside of the apparatus makes the device useless for special applications, such as in aircraft, ships and the like.

The object of the present invention consists therein that the aforesaid drawbacks are eliminated by an increase of the evaporating surface and a complete and tight closing of the reserve of water.

The invention indeed consists in a cooling vessel or container for food products, in which the cooling is obtained by natural evaporation of water impregnating a porous body, with that characteristic that the apparatus is formed with a separate cylindrical or polygonal body made of porous earthenware or like absorbing material, the outer wall thereof being provided with ribs or other unevennesses for increasing the surface of evaporation, whereas the lower end of said jacket or body is immersed within a water basin which is completely closed by the aforesaid body.

According to a preferred form of construction, the cooling vessel or vat will be formed as a cylinder and the outer wall will have annular projections or ribs so as to increase the evaporation surface to a maximum and obtain an increased cooling effect.

The vessel is provided at the bottom portion with a flange, by means of which the body rests upon the rim of a metal water basin with interposition of a rubber ring, so that the water containing cup is completely closed.

The opening giving access to the cooling vessel may be closed by means of an insulating cover.

The inner useful space of the vessel may be provided with the required fittings; however, according to the invention, a convenient metal frame is provided and has one or more adjustable grids or plates for supporting the articles to be preserved, or otherwise a metal cylindrical receptacle having a plain bottom is introduced into the vessel and provided eventually with a cock when the apparatus is intended for preserving and cooling liquids.

By way of example, a practical form of embodiment will be described hereafter with reference to the accompanying drawing.

Figure 1:
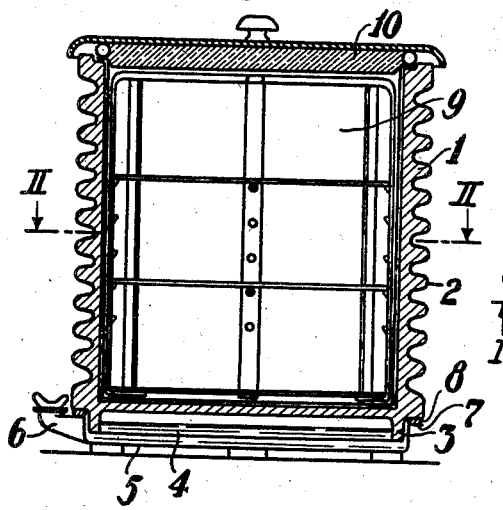
Fig. 1 is a vertical axial section of the cooling vessel according to the invention and taken on line I—I of Fig. 2.
Figure 2:
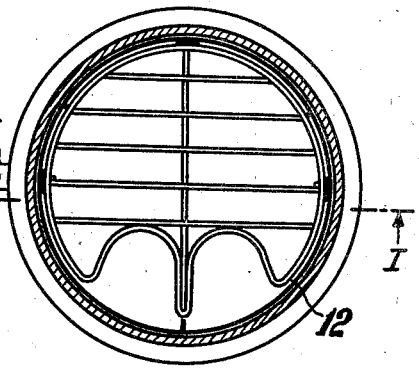
Fig. 2 is a horizontal section on line II—II of Fig. 1.
Figure 3:
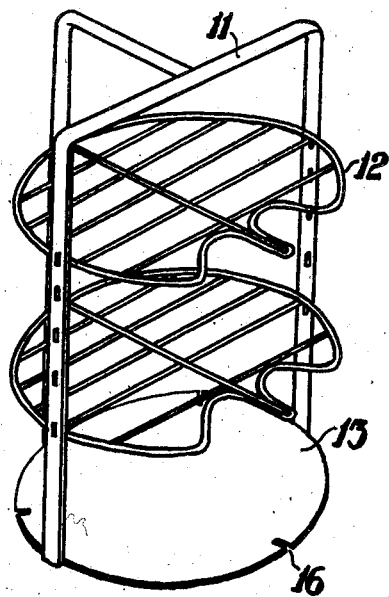
Figs. 3 and 4 illustrate in perspective views a metal supporting frame for the goods and a metal container fitting within the cooling body of the apparatus.

With reference to the drawing, the cooling vessel according to the invention will be formed by means of a cylindrical vat 1, made of porous earthenware and of which the outer wall surface is increased by multiple ribs 2. The evaporating surface and consequently the cooling effect will be accordingly increased.

The lower edge 3 of the porous body is permanently in contact with the reserve of water 4, which has been poured in the cup-shaped basin 5 and which may be subsequently filled through the inlet tube end 6 provided with a convenient closure, in order to compensate the losses through evaporation and impregnation.

The device is characterized by the fact that the casing 5 is provided with a flange 7 supporting a rubber ring 8 to be engaged by the body of the vessel 1, so that a perfect closure of the water reserve 4 is secured.

The upper opening of the body 1 gives passage to the inner useful space 9 and may be closed by means of an insulating cover 10.

Figure 4:
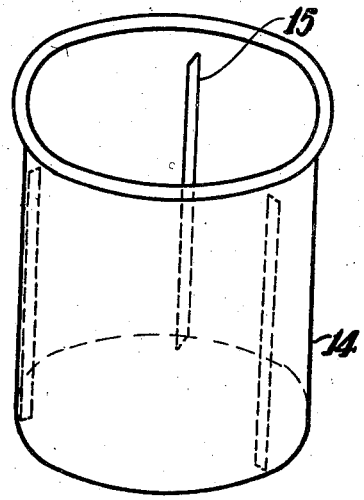

Another feature of the invention consists in the inner arrangement of the cooling vessel. Use is made therefor of a metal frame 11, having grids 12 adjustable in height and a plate 13, which can slide exactly in the metal inner fitting 14 illustrated in Fig. 4. This metal fitting 14 is provided inside with guide strips 15 engaging notches 16 of the plate 13.

The frame 11 can be lifted from the cooling vessel and by slight partial rotation be held out of the body 1, while supported by the aforesaid guide strips 15.

Obviously, the invention is not restricted to the particular construction described, but such apparatus may also be constructed in polygonal shape and of any porous material, such as earthenware, textile fibres and the like, whereas the outer wall may present any type of unevennesses or projections which are brought in contact with the water reserve in any convenient manner.

We claim:

1. A cooling vessel comprising a tubular body of porous material having a smooth inner wall and circular corrugations outside, an insulated cover for the upper opening of the tubular body, a plain bottom portion having a downwardly extending flange, a separate water basin supporting the tubular body, said flange extending downwards in the water contained in the basin, and a rubber ring interposed between said bottom portion and the upper edge of the basin at the outside of the flange.

2. A cooling vessel comprising a tubular body of porous material having a smooth inner wall and circular corrugations outside, an insulated cover for the upper opening of the tubular body, a plain bottom portion having a downwardly extending flange, a separate water basin supporting the tubular body, said flange extending downwards in the water contained in the basin, a rubber ring interposed between said bottom portion and the upper edge of the basin at the outside of the flange, and a metal cylindrical container fitting inside the body.

HUBERTUS HENDRIK MONTAUBAN
VAN SWIJNDREGT.
GERRIT JOHANNES DE BRUYN.